United States Patent [19]

Roe

[11] Patent Number: 4,570,586

[45] Date of Patent: Feb. 18, 1986

[54] INTERNAL COMBUSTION ENGINE

[75] Inventor: Geoffrey E. Roe, Stockport, England

[73] Assignee: The Victoria University of Manchester, Manchester, England

[21] Appl. No.: 358,714

[22] Filed: Mar. 16, 1982

[30] Foreign Application Priority Data

Mar. 24, 1981 [GB] United Kingdom ................. 8109178

[51] Int. Cl.[4] ........................ F02B 75/06; F16F 15/28; F16F 15/30

[52] U.S. Cl. .................................... 123/192 B; 74/604

[58] Field of Search ............ 123/41.84, 192 R, 192 B, 123/73 A, 195 R, 195 A, 90.15, DIG. 8; 74/603, 604

[56] References Cited

U.S. PATENT DOCUMENTS

| | | | |
|---|---|---|---|
| 1,038,541 | 9/1912 | Ducker | 123/192 R |
| 1,767,309 | 6/1930 | Ricardo | 74/604 |
| 2,117,700 | 5/1938 | Burkhardt | 123/192 B |
| 2,284,515 | 5/1942 | Criswell | 123/192 B |
| 2,955,750 | 10/1960 | Phelps | 123/192 B |
| 3,403,605 | 10/1968 | Schmidt | 123/192 B |
| 3,744,342 | 7/1973 | Kinoshita | 123/192 B |
| 4,131,096 | 12/1978 | Mitchell | 123/90.15 |
| 4,340,018 | 7/1982 | Kirk | 123/41.84 |

FOREIGN PATENT DOCUMENTS

| | | | |
|---|---|---|---|
| 1210249 | 10/1970 | United Kingdom | 123/192 B |

*Primary Examiner*—Craig R. Feinberg
*Assistant Examiner*—W. R. Wolfe
*Attorney, Agent, or Firm*—LeBlanc, Nolan, Shur & Nies

[57] ABSTRACT

An internal combustion engine having an oil-retaining cylinder block and crankcase (10), a cylinder head (11), a cylinder liner (12) defining the cylinder (13) in which a piston (14) reciprocates, and a crankshaft (15) on which the piston is mounted via a connecting rod (16). The flywheel (17) is mounted on the crankshaft (15) and extends upwardly alongside the base of the cylinder liner (12) whereby the maximum radius of the flywheel is greater than the minimum distance between the rotational axis of the crankshaft and the lowermost position occupied by the base of the piston at bottom dead centre position. Thus there is provided an offset flywheel of low mass but providing a substantial moment of inertia while the overall height of the engine is be reduced without loss of horsepower.

5 Claims, 3 Drawing Figures

INTERNAL COMBUSTION ENGINE

This invention relates to internal combustion engines, and particularly, though by no means exclusively, to single-cylinder motorcycle engines.

When designing motorcycle engines it is important to minimise the overall height of the engine since the space within the frame of a motorcycle within which the engine is to be housed is limited and it is important to ensure that the base of the engine is located at a sufficient height above the road surface to prevent damage when riding over uneven surfaces, whilst still maintaining a low centre of gravity.

The height of the engine is determined inter alia, by the length of the piston stroke and the diameter of the flywheel. Conventionally, the flywheel is attached to the crankshaft of the engine and contained within the crankshaft casing, and since the crankshaft is housed beneath the cylinder, the flywheel is necessarily of small diameter to accommodate the base of the piston at the bottom of its stroke. A flywheel of small diameter must be of substantial mass in order to provide the moment of inertia required. Thus the overall weight of the engine is excessive.

For a given mass the moment of inertia of any flywheel increases with the square of its radius, and in order to increase its radius without interfering with the motion of the piston, or excessively increasing the height of the engine, some engines have been designed with the flywheel rotating externally of the crankcase. Unfortunately, this presents certain other problems in so far as external rotation produces excessive noise, is dangerous to the user and requires an extra seal at the position where the the crankshaft projects through the crankcase to support the flywheel.

Since the crankshaft and flywheel constitute a large fraction of the total engine weight, an object of the present invention is to provide an internal combustion engine of the kind having a crankshaft carrying a flywheel, wherein the aforementioned difficulties are at least substantially overcome, whilst the overall height and weight of the engine are maintained as low as possible.

According to the present invention, there is provided an internal combustion engine of the kind having a crankshaft and at least one reciprocating piston, an oil retaining crankcase housing the crankshaft, and a flywheel co-axially mounted on the crankshaft, characterised in that the flywheel is housed within the crankcase and the maximum radius of the flywheel is greater than the minimum distance of the piston from the rotational axis of the crankshaft.

An embodiment of the invention will now be described, by way of example only, with reference to the accompanying drawings in which.

Figure 2:
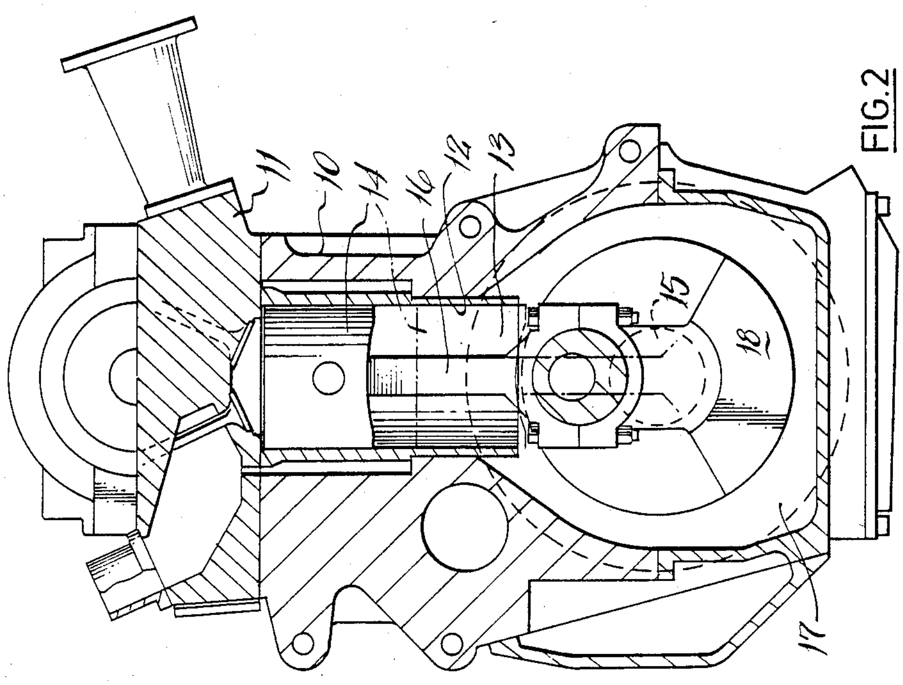
FIG. 2 is a partial vertical section taken on line II—II of FIG. 1.

Referring now to the drawings, the engine essentially comprises a combined cylinder block and crankcase 10, a cylinder head 11, a cylinder liner 12 defining the cylinder 13 in which a piston 14 reciprocates, and a crankshaft 15 on which the piston is mounted via a connecting rod 16.

Figure 1:
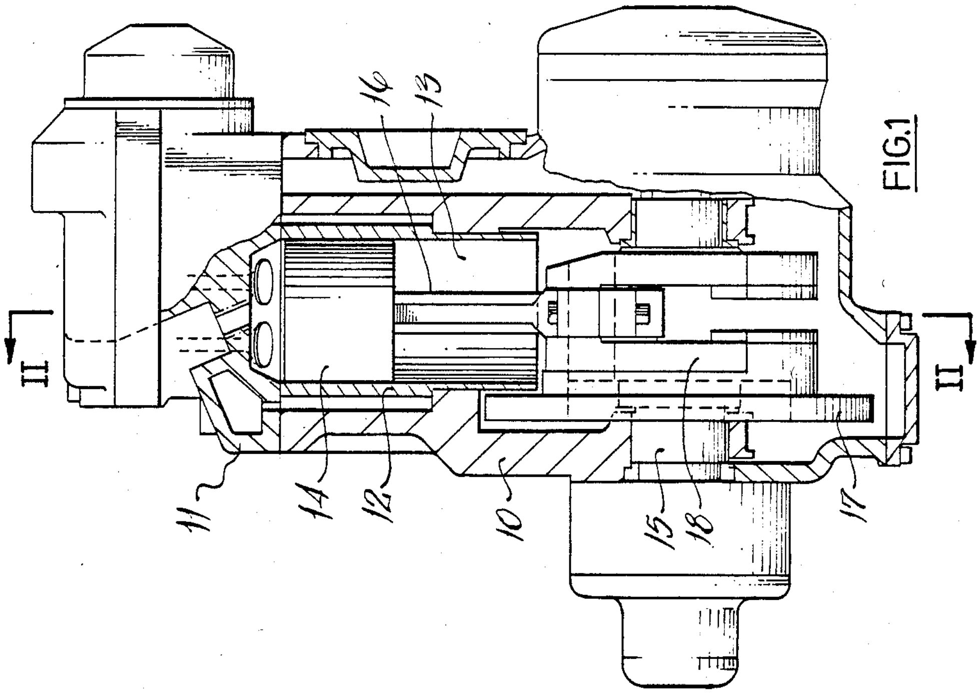
FIG. 1 is a partial vertical section through a single-cylinder motorcycle engine illustrating those components of the engine which are pertinent to the invention.

As will be seen particularly from FIG. 1, and in accordance with the invention, a flywheel in the form of an annular ring 17 is bolted to a balance weight and web arrangement 18 attached to or integral with the crankshaft. In this way, the flywheel 17 in its upper region stands alongside the lower region of the cylinder liner 12 and thus the piston 14 can descend to a position just below the base of the cylinder liner. The bottom dead centre position of the piston is illustrated in dotted lines in FIG. 2.

By placing the flywheel in its position offset from the cylinder but within the crank case its radius is greater than the minimum distance between the rotational axis of the crank shaft and the lowermost position occupied by the base of the piston at bottom dead centre. Since the moment of inertia of a flywheel is proportional to the square of its radius, the mass of the annular ring 17 is thus considerably reduced in relation to that of a conventional flywheel with the same moment of inertia which is located wholly below the cylinder.

It will be appreciated that an offset flywheel of low mass allows the overall height and weight of the engine to be reduced without loss of horse power and this presents considerable advantages in the accommodation of the engine and its ancilliary parts such as the carburettor and the exhaust system, within the frame of the motorcycle.

Figure 3:
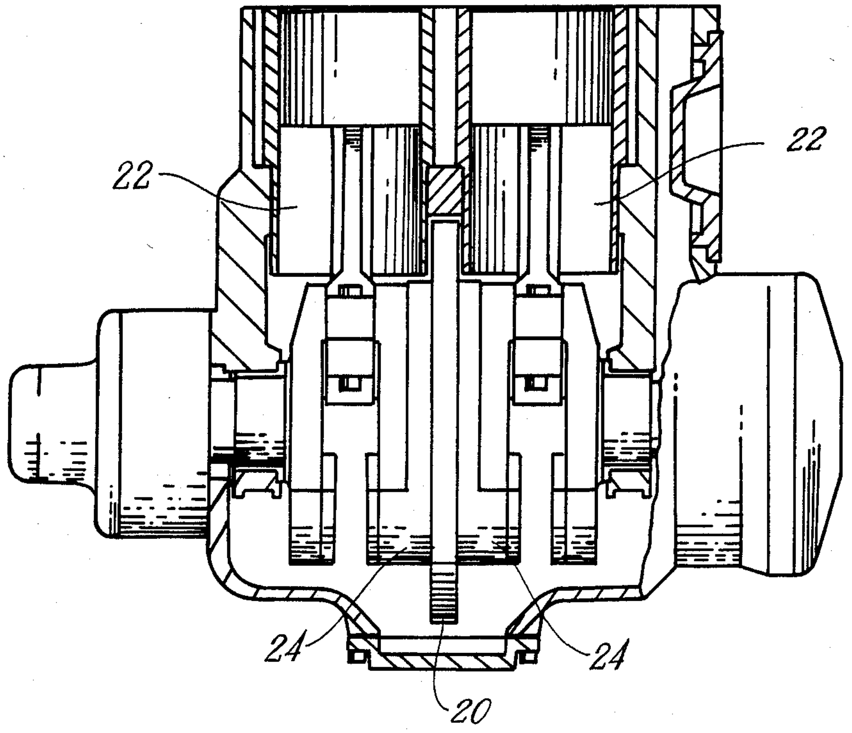
FIG. 3 is a partial vertical section similar to FIG. 1, showing an embodiment of the invention in which a pair of cylinders are arranged side-by-side in the crankcase.

It is not intended to limit the invention to the above example only. For example, the construction and location of the flywheel in accordance with the invention can be incorporated in single-cylinder engines for other purposes such as driving lawn mowers or outboard marine motors. If the engine is to include two or more cylinders, then the flywheel may be housed for convenience so as to extend upwardly between the cylinders. Such an embodiment is shown in FIG. 3 wherein the flywheel 20 extends upwardly between the cylinders 22, and with a balance weight 24 being located below each cylinder 22.

What is claimed is:

1. An internal combustion engine of the kind having a crankshaft, at least one piston reciprocating within a cylinder, a flywheel co-axially mounted on the crankshaft, and an oil-retaining crankcase housing the crankshaft, characterized in that the flywheel, in the shape of an annular ring, is housed within the crankcase and is offset axially from the cylinder along said crankshaft and is so configured and positioned that a portion of its periphery stands directly alongside and adjacent a portion of said cylinder, and with a balance weight being attached to the crankshaft adjacent the flywheel, said balance weight being positioned directly below the cylinder.

2. An internal combustion engine according to claim 1, wherein the flywheel is formed as an annular ring attached to a balance weight and web arrangement itself rigid with the crankshaft.

3. An internal combustion engine according to claim 1, comprising a combined cylinder block and crankcase containing a cylinder liner defining the cylinder in which the piston reciprocates, said flywheel in its upper region standing alongside the lower region of said cylinder linear whereby the piston can descend to a position just below the base of said liner.

4. An internal combustion engine according to claim 1, including a pair of cylinders arranged side-by-side in the crankcase, said flywheel being disposed such that its periphery extends upwardly between said two cylinders.

5. An internal combustion engine according to claim 1, wherein a cylinder liner defines the cylinder within which the piston reciprocates, a portion of said cylinder liner serving as a vertical wall which defines a portion of the cavity in said crankcase within which said flywheel is housed.

* * * * *